Figures 1, 2, 3:
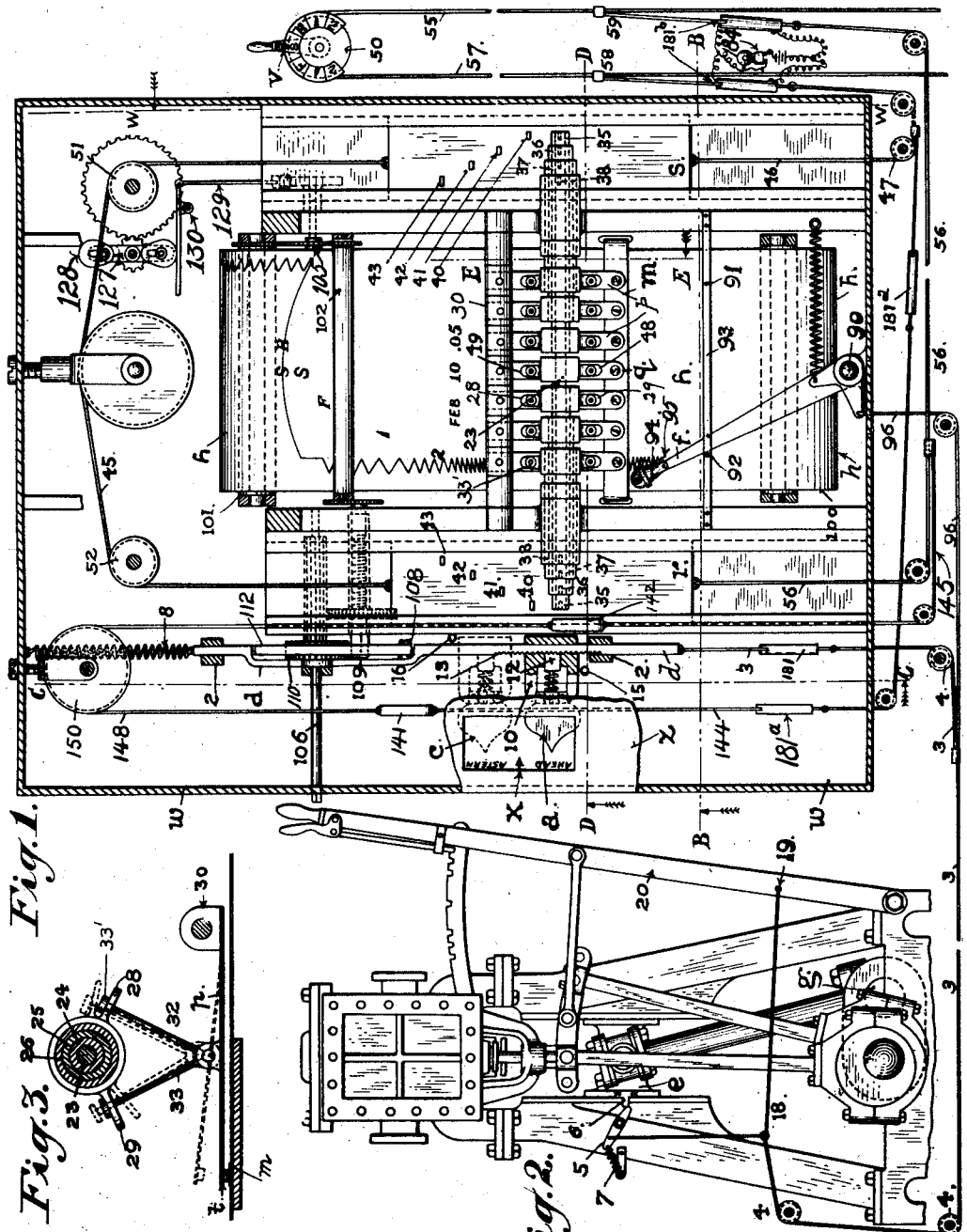

No. 885,529. PATENTED APR. 21, 1908.
W. S. RUSH.
MOTION INDICATOR AND RECORDER.
APPLICATION FILED MAR. 25, 1907.

3 SHEETS—SHEET 1.

WITNESSES: INVENTOR
BY
ATTORNEY

No. 885,529. PATENTED APR. 21, 1908.
W. S. RUSH.
MOTION INDICATOR AND RECORDER.
APPLICATION FILED MAR. 25, 1907.
3 SHEETS—SHEET 2.
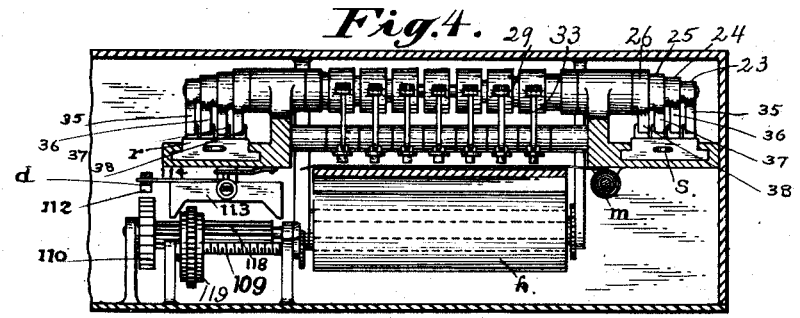
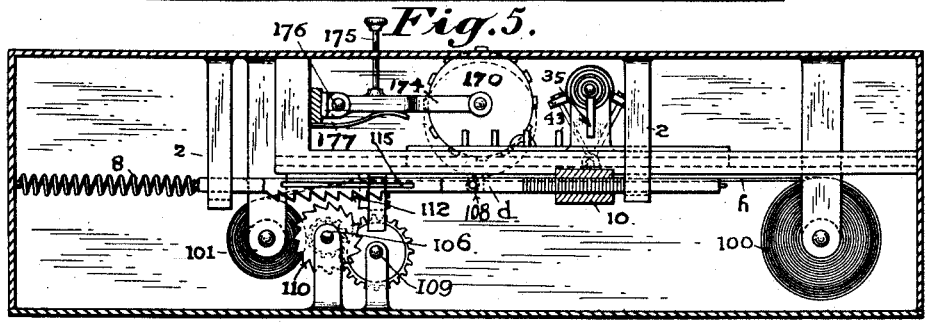
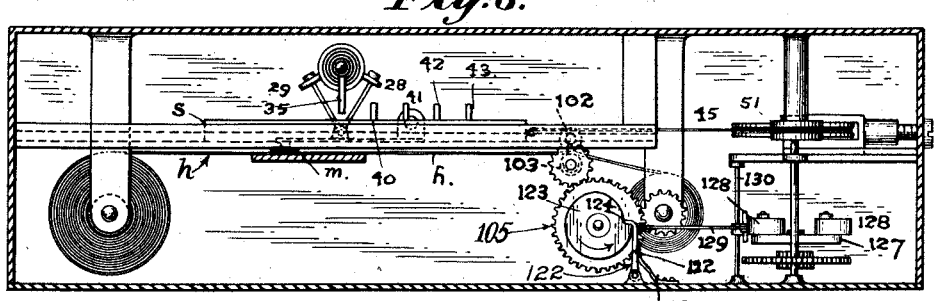
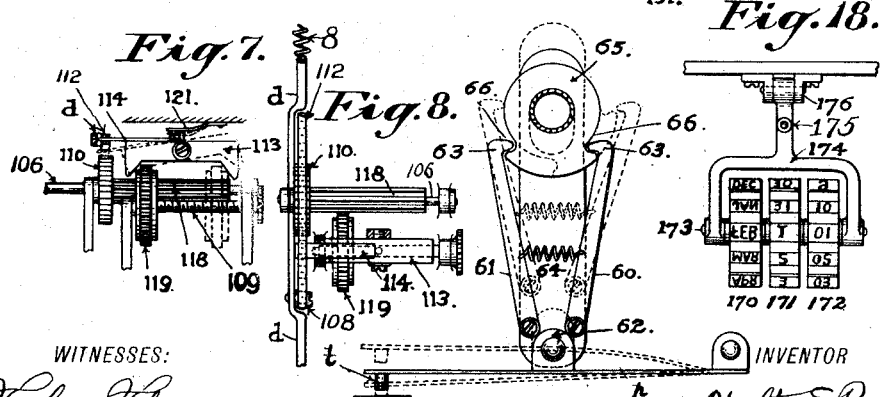
WITNESSES:
INVENTOR
Walter S. Rush
ATTORNEY No. 885,529. PATENTED APR. 21, 1908.
W. S. RUSH.
MOTION INDICATOR AND RECORDER.
APPLICATION FILED MAR. 25, 1907.
3 SHEETS—SHEET 3.
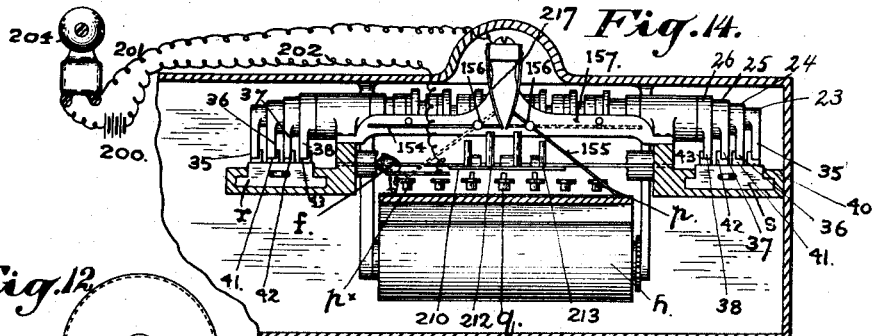
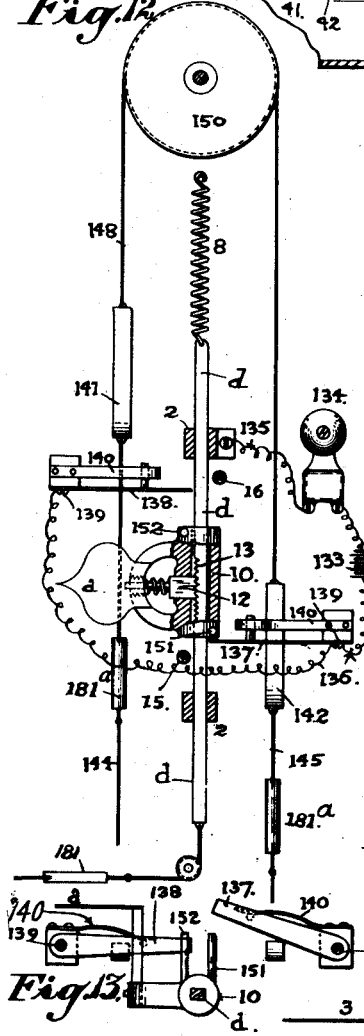
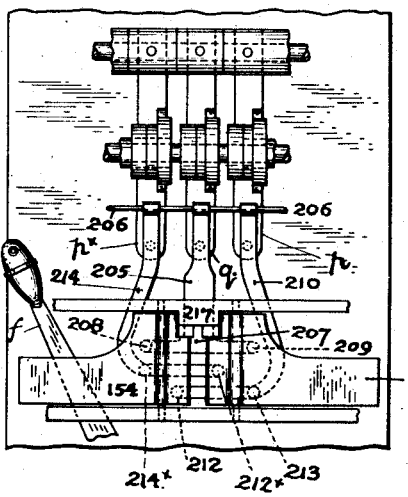
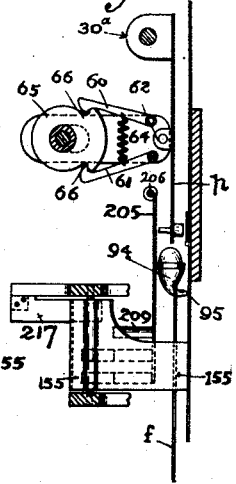
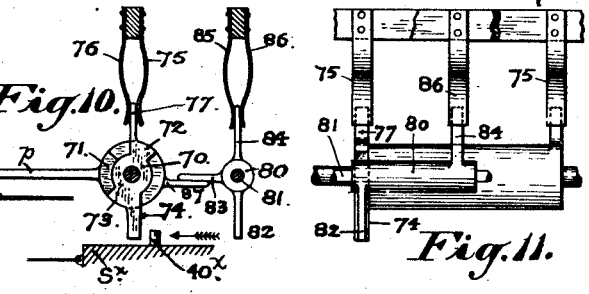
WITNESSES:
F. C. Fliedner
L. M. Frank
INVENTOR
Walter S. Rush
BY
E. Gorton
ATTORNEY

UNITED STATES PATENT OFFICE.

WALTER S. RUSH, OF SAN FRANCISCO, CALIFORNIA.

MOTION INDICATOR AND RECORDER.

No. 885,529.

Specification of Letters Patent.

Patented April 21, 1908.

Application filed March 25, 1907. Serial No. 364,468.

*To all whom it may concern:*

Be it known that I, WALTER S. RUSH, a citizen of the United States of America, residient of the city and county of San Francisco and State of California, have invented new and useful Improvements in a Motion Indicator and Recorder, of which the following is a specification.

This invention relates to improvements made in means or devices to indicate in the pilot-house, or other station on a vessel, the direction in which the engine is running, and also the changes or variations in the direction and the character of its motion.

The invention has several features in common with a motion-indicator combined with mechanism for recording in a permanent form the movements of the engines as indicated by the motion-indicator, which I have made the subject of an application for Letters Patent filed on the 23rd day of January, 1907, Serial No. 353,720. But instead of being combined for operation with the well-known "bell-pulls" for operating the bells in the engine-room, as in the application above referred to, the present improvements are designed for operation in combination or in connection with a "telegraph" or other signaling means in which visual, as well as audible signals are employed to direct the engineer.

These improvements relate more particularly to a novel construction of motion-indicating device having reciprocating motion in a right line in harmony with the motion of the engine; also, to novel means for operating a traveling record-strip with a progressive movement of greater or less duration; also, to novel means of operating recording-devices from the motion-indicator and also from the "telegraph", or signaling means.

The improvements embrace, also, the combination with a motion-indicator and recorder of an alarm or signaling-device so operated from or through the movements of the signaling-mechanism, or the indicator, as to sound a warning-signal in the engine-room in the event of the shaft being caused to move in a contrary direction, or manner, to that which the signal calls for.

The improvements embrace also, an improved motion-indicator and recorder for a ship's engine having several novel and useful features, all as hereinafter described and pointed out in the claims at the end of this specification.

The following description explains at length the nature of this invention, and the manner in which I proceed to produce, apply and carry out the same, the accompanying drawings being referred to herein by figures and letters.

Figure 1 of the drawing is a front-elevation of a motion-indicator and recorder embodying my said invention and combined with a "telegraph signal"; showing the parts of the indicating-device and the recording-mechanism inclosed in the same case from which the front is removed, excepting the portion of the front-plate immediately around the opening where the indicator-hand is exposed to view. Fig. 2 illustrates the means employed to vibrate the indicating-device and change its position from one side to the other of the sight-opening from the reversing-gear of an upright marine-engine. Fig. 3 is a detail, on an enlarged scale, of the means for actuating the type-bars of the recording-device, the same being a cross-section at E—E, Fig. 1. Fig. 4 is a transverse section through Fig. 1, on the line D—D, Fig. 1, the indicating mechanism being omitted. Fig. 5 is a longitudinal sectional view on the line C—C, Fig. 1. Fig. 6 is a similar sectional view on the line W—W, Fig. 1. Figs. 7 and 8 are details in elevation and plan, respectively, of the winding mechanism connected with the clock-mechanism which moves the record-strip. Fig. 9 illustrates a modification of the type-bar actuating-mechanism, the same being a detail view similar to Fig. 3. Figs. 10 and 11 illustrate another modification of type-bar actuating mechanism; Fig. 11 being an elevation taken from the right of Fig. 10. Fig. 12 is a detail, on an enlarged scale, of the warning-signal operating mechanism. Fig. 13 is a detail elevation of parts of the mechanism illustrated in Fig. 12. Figs. 14, 15 and 16 illustrate a modification of the means for operating a warning signal from the movements of the recording-devices; Fig. 14 being a cross-section through the recording-mechanism at the line B—B, Fig. 1; Fig. 15, a plan of Fig. 14, and Fig. 16, an elevation from the right of Fig. 15. Fig. 17 is a detail, on an enlarged scale, of the device which gives an alarm when a connecting wire breaks and renders the mechanism inoperative. Fig. 18 is a top-view of the dating device for marking the day and year on the record-strip.

The motion-indicating device in the present invention consists of a hand $a$ situated at a sight-opening $c$ in the front-plate $z$ of the case W, and attached to, or connected with, a bar $d$ to which a reciprocating movement is imparted by connecting the bar with some continuously moving part of the engine, such as the cross-head in a reciprocating engine, so that a vibratory, or short reciprocating movement is imparted to the bar $d$, and by that part to the indicator connected to it, and the vibrations of that part will correspond to the reciprocations of the cross-head. The bar $d$ is movable in guides 2—2 in the case, and from its lower end a wire 3 is carried in the required direction by bell-cranks or sheaves 4 to the engine, where the wire 3 is connected with some part of the driving-mechanism that changes its position with the changes made in the direction of rotation of shaft, such as the reversing lever 20.

One end of a contact lever 5 which is mounted upon some convenient part of the engine frame being situated in the path of the finger 6, is struck by that part as the slide $e$ is driven by the crank $g$, thereby producing a reciprocating movement of the hand $a$ from the movements of the crank. The part $a$ thus being vibrated in harmony with the revolutions of the engine-shaft, indicates the motion of the shaft. A coiled-spring 7 connected to the lever 5 acts in opposition to the finger 6, causing the lever to return or move in the opposite direction to that in which it is moved by the finger 6.

Attached to a fixed point in the case and connected to the bar $d$, is a coiled-spring 8, the tension of which acts contrary to the force of the lever 5. This spring 8 has the additional function of shifting the indicator $a$ from a working-position on one side of the center of the sight-opening over to the opposite side at the instant that the motion of the engine is reversed.

The indicator $a$ by its position on one side or the other of the center X of the sight-opening indicates the particular direction in which the vessel is being driven, whether "ahead" or "astern"; whereas, by its vibratory, or short reciprocating movement it indicates the character of the motion, whether it be fast or slow, and whether the engine be in motion or at rest. The indicator $a$ is moved in harmony with the revolutions of the engine-driven shaft by connecting it with a moving part of the engine, as before described; and by connecting it, as well, with the reversing-gear of the engine, or with some part of the engine-mechanism that occupies one position when the engine is running forward, and another position when the engine is reversed. By being so connected, the bar $d$ will effect by its movement a change in the working position of the indicator as often as the direction of the motion or travel of the engine-driven shaft takes place. A simple and effective way to make this change or adjustment of the indicator $a$ is illustrated in Figs. 1 and 15, wherein the indicator $a$ is fixed to or forms a part of a sleeve 10 held normally in a certain position on the bar $d$ by a friction-clutch comprising a spring-held block 12 provided with a serrated face that is held against a corresponding surface 13 on the bar $d$ by a coiled-spring bearing against the back of the block.

The sleeve 10 is limited in its movement by stops 15—16 so as to have less movement than the bar $d$ under certain conditions; the stops being so placed on opposite sides of the sleeve 10 that by a long throw or movement of the bar exceeding its ordinary strokes or reciprocations the lower stop will limit the length of the movement of the sleeve in one direction, and the remaining stop 16 will similarly limit its movement in the opposite direction, thus allowing for any variation in the length of the connecting wires.

The wires 3—18 connecting the indicator with the reversing-gear of the engine are attached to the reversing-lever 20 at 19, as well as to the lever 5, and tension thereon is maintained by the coiled-spring 8, the retractile force of which draws the bar $d$ through its guides 2 when the lever 20 is thrown over to the left and the wires are allowed to slacken. The bar $d$ at such time being drawn upward by the coiled-spring 8 will bring the sleeve 10 towards the stop 16. On the other hand, when the reversing-lever 20 is moved to the right to change the direction of the engine, the spring 8 will yield to the strain on the wires 3—18 and the bar $d$ will be drawn down. By that long movement the sleeve 10 will be brought towards the stop 15, and the indicator $a$ which is attached to, or is a part of, the sleeve will be set in a different working position on the opposite side of the center X of the sight-opening. These positions are indicated in Fig. 1, by the dotted lines and the full lines respectively.

In that position of the indicator represented by the dotted lines it will indicate the motion astern; and in the position represented in full lines, that the engine is driving the vessel ahead. The two positions are usually distinguished by the words "Ahead" and "Astern" marked on the back of the case behind the sight-opening, or on the glass panel covering the opening.

In the ordinary vibratory movement of the bar $d$ the sleeve will be held on the bar by the friction-clutch and will have the same vibratory motion, and only in a long throw of the bar due to any vibration in the length of the connecting wires will the sleeve be brought against one or the other of the stops 15—16, and its position on the bar be changed accordingly.

The recording means combined with this motion-indicator prints or marks on a movable web of paper, or record-strip, a permanent record of the above described changes taking place in the working-position of the indicator $a$, and a record is made also of the vibrations of the indicator in either of its positions, and of the relative speed or rapidity of the vibratory motion.

The recording means employed are typebars operated by or from the movements of the "telegraph", or signaling mechanism, and also a recording-device actuated by or from the parts that give vibratory motion to the indicator $a$, and operating to mark a continuous line on the record-strip. The two sets of records produced by these means are made for convenience upon the same recordstrip, on which the type-bars print letters or characters of different kinds in separate rows or series so arranged or disposed as to enable the records of one set of signals or movements of the indicator to be readily distinguished from the other, and one set to be read also with reference to the other. In the present construction employed the recording device records the motions and the variations in the motions when the engine or the shaft operated by it is revolving in a forward direction, and also when the direction of the motion is changed; and the type-bars are employed to make a record of the signals transmitted to the engine-room.

In the last mentioned mechanism two sets of type-bars are arranged in line across the record-strip above an inking-ribbon $m$, on which the type on the end of the bar is caused to strike by the reactive force of the bar as often as that part is raised and allowed to drop. The inking-ribbon may be fed intermittently by any well-known means operated from the same mechanisms that give movement to the type-bars or record-strip. The type-bars and the actuating means in both sets being the same in construction and operation, a description of one type-bar and the means actuating it will apply as well to all the others. A solid shaft 23 supported in brackets across the record-strip forms a common axis for a number of concentrically placed sleeves 24, 25, 26 of regularly increasing diameters, and regularly decreasing in length one over the next, and each also separately rotatable on the next smaller one.

Each type-bar is a strip of spring metal $p$ fixed at one end to a stationary support 30 and having sufficient stiffness to hold the type-head $t$ on its free end normally out of contact with the record-strip. The impression of the type on the paper is produced by bending the bar out of its normal plane, and then allowing it to spring towards the paper. The means preferably employed to so draw back and release the type-bar comprises the sleeve or short tubular shaft for each bar, having a limited oscillatory or partially rotative movement on an axis 23 directly over the bar and provided with two radial arms 28, 29, from each of which a link extends to and is loosely attached to the type-bar. The two arms are situated on opposite sides of the axis of rotation, and the links 32—33, which are best formed of rods, or stiff wires, extend through elongated holes in the arms and are each provided with an enlarged head 33' on the outer end, as seen in Fig. 3. Each of the radial arms in its movement toward the type-bar when the sleeve is turned on its axis will slip or play in the link; but on the movement of the arm in the opposite direction it will draw the type-bar with it and thus bend the bar out of its normal plane. One or the other of the radial arms will act on the type-bar, therefore, in the rotation of the sleeve in either direction, and an impression will be made on the paper by a particular type-bar when its actuating sleeve is turned on its axis, whether in one direction or the other. Such rotative movement of the sleeve is produced by a pin 35 on the outer end of the sleeve engaging a stop on a slide-plate over which the outer end of the sleeve extends; the pin being fixed in the sleeve at right angles to the axis of rotation to stand in the path of the stop on the slide. To operate the two sets of rotatable sleeves, one on the right and the other on the left, there are two slides $r$, $s$, each having a series of stops 40, 41, 42, 43.

The stops on the slide $r$ and those correspondingly numbered on the other slide $s$ correspond in number with the type-bars to be operated. In the particular construction herein described seven separate type-bars are employed to make as many different records, and the same are arranged in two sets of three type-bars $p$ each upon opposite sides of a middle type-bar $q$, so as to provide two sets of records; of which those on the right being operated by the slide $s$, serve to record the different signals on the "astern" side of the telegraph dial, and those on the left that are operated by the other slide $r$ make separate records of the corresponding signals on the "forward" or "ahead" side of the dial. The middle type-bar $q$ is common to both sets of records and is operated by either slide to record every "stop" signal, and also every "start" signal as the same is transmitted. To that end the middle typebar is actuated by a set of radial arms 48—49 fixed to and extending from the central solid shaft 23 that also supports and forms the axis for the sleeves which are set concentrically thereon. By virtue of this arrangement the two sets of type-bars mark on the record-strip every signal transmitted to the engine-room through the "telegraph" or signaling means by which orders are given from the pilot-house.

The first type-bar in each set which is nearest the "stop" type-bar, or middle type-bar $q$, prints the letter "F" or "B" according as the signal is set to "Forward," or "Backward" on the dial; the second and third type-bars print the numerals "1" and "2" denoting, respectively, "slow," "halfspeed" and "fullspeed," either ahead or astern, according as the pointer $v$ of the dial 50 is moved from the center "S" to the left or to the right. The middle type-bar $q$ being always operated when the pointer is moved to or away from the center, makes a record of every "stop" signal as well as countermanding it before every "start" signal. Additional type-bars can be provided when a telegraph contains additional signals. Operating each type-bar in every movement of the slide in either direction in this manner has the advantage of giving a permanent record not only of every change made in an order or signal, but also of the interval of time elapsing between a signal and the one substituted for, or following it.

A wire or cable 45 carried from the upper end of one slide over guide-pulleys 51, 52 and down to the other slide, is attached to the upper end of the opposite slide. From the lower or opposite end of each slide the wires 46 and 56 running out through the bottom of the case are turned in the proper direction by guide-pulleys to be connected with the wires 55, 57 that run from the telegraph to the engine-room. These connections are so made that when the pointer of the telegraph is moved from its position on the center toward the left to transmit any one of the signals on the forward side, the left slide $r$ will be drawn down and the right slide $s$ will move in the opposite direction. Or, if the pointer $v$ be moved to the right to transmit the signals on the opposite side of the dial, the slide $s$ will be drawn down and the slide $r$ on the left will be drawn upward.

In the present construction the slides are connected directly with the wires 55—57 leading from the engine-room to and around the sheave 50 of the telegraph, and thence back to the engine-room, where they are connected in the usual manner with the sheave or part that operates the index at that end. The wire 46 attached to the lower end of the right slide is connected at 58 to the wire 57 of the telegraph, and the wire 56 attached in like manner to the other slide $r$ is connected at 59 to the wire 55, as seen in Fig. 1.

The stops 40, 41, 42, 43 on the slides are so positioned with relation to the pins 36, 37, 38 on the outer ends of the overlying sleeves 24, 25, 26 and the pin 35 on the center shaft 23, and also with reference to the throw of the slide, that as the pointer of the telegraph is moved from its central position to transmit a signal read on the "forward" side of the dial, the first stop 40 on the slide $r$ will strike the pin 35 on the end of the central shaft 23, and the middle type-bar will be operated, thereby printing the letter "S" as often as the pointer is moved away from the signal "S," towards the forward side. A further movement of the slide $r$ in the same direction brings the second stop 41 in contact with the pin 36 on the end of the first sleeve 24 immediately surrounding the central shaft, which thereupon operates the next type-bar of the series on the left of the middle bar $q$, with the effect to print the letter F. Or, if the slide continues to move in the same direction as the pointer is moved from "F" to "1," the third stop 42 will strike the pin 37 on the next larger sleeve and the type-bar operated by that sleeve will print the signal-number "1." A further movement of the slide $r$ in the same direction will bring the fourth stop 43 in working contact with the pin 38 on the outermost or shortest sleeve at the moment that the pointer indicates on the dial the signal "2" or "Full speed ahead," and a record of the same will be made on the paper.

The stops on the slide are arranged at intervals apart, one behind another, to operate the type-bars at the proper moments with reference to the different positions in which the pointer $v$ of the telegraph may be set. The same arrangement is followed on the opposite slide $s$, excepting that its stops 40, 41, 42, 43 correspondingly numbered are necessarily set on an opposing diagonal line for successive action upon the central shaft 23 and the three concentric sleeves 24, 25, 26 composing the series on the right. As one slide moves upward when the other is drawn downward, the stops on the upwardly moving slide will strike the pins and actuate the sleeves while moving in that direction, as well as in moving down or in the opposite direction, thus recording when the orders are countermanded.

Figs. 9 and 16 illustrate a construction of type-bar operating means in which the same movements of the type-bar are produced from the sleeve by two dogs 60, 61, loosely attached to the type-bar by a hinge-joint 62 and having hook-shaped ends 63 that are held by a spring 64 against the periphery of a tumbler 65 on the end of the sleeve. Under the rotation of the sleeve in either direction the shoulder 66 on the ascending side of the tumbler will engage the hoked end of the dog on that side and draw the type-bar back, while the shoulder on the opposite or descending side will move away from the hooked end of the dog on that side without acting on it.

The modification illustrated in Figs. 10 and 11 for drawng back and releasing the type-bar has the advantage of securing a more direct action of the slide upon the type-bar. It consists of a collar 70 turning on the same center with the sleeve, and connected to it by clutch-faces comprising a projecting segment 71 on the end of the sleeve and corresponding segments 72, 73 on the circumference of the collar separated by a recess of greater length on the sleeve, as seen in Fig. 10. On turning the collar on its axis in one direction it will engage and turn the sleeve, but in the opposite direction the sleeve will not be acted on, and the collar only will turn. A finger 74 on the collar standing in the path of the pin or stop 40$^\times$ on the slide $s^\times$ will turn the collar, and that part engaging the sleeve will turn it when the slide moves with arrow; but the collar 70 will turn without moving the sleeve when the slide $s$ moves in the opposite direction, and no operation of the type-bar $p$ will then take place. The two flat springs 75, 76 pressing from opposite directions against a pin 77 fixed in the collar 70, holds that part normally in position with its finger 74 perpendicular to the slide $s^\times$, and in the path of one of its stops. The function of these springs is to bring the collar back to its normal position after it has been struck and moved by the stop on the slide from either direction. As this construction will cause the type-bar to print only in the forward or downward movement of the slide, and not when the slide is moved in the opposite direction, a means is provided for operating the type-bar to record the return movement of either slide, so as to make the record show the conditions under which the signals were transmitted; and particularly when one signal or order was changed or substituted for another by the pilot. The record thus made will show also the sequence in which the signals were sent to the engine-room. The "return-record" as it may be termed, which is made by operating the type-bar in the contrary movement of the slide shows when the signals or orders were countermanded, and is effected by a tubular rock-shaft 80 fitted loosely on a fixed support 81 and having three radial arms, 82, 83, 84 standing at 90° apart, one of which extends perpendicularly downwards in the path of the stop on the slide; another 84 extending perpendicularly upward is confined between two flat springs 85 86 that bear against it from opposite sides; and the third arm 83, projecting forwards at right angles to the others, rests upon an arm 87 on the sleeve of the type-bar. By pressing down upon that arm 87 when the rock-shaft is partially rotated in one direction, the sleeve 70 will be turned, thereby raising the outer end of the type-bar and then allowing it to spring back against the record-strip at the moment that the arm 83 of the rock-shaft is released. This operation takes place, therefore, when the stop 40$^\times$ strikes against and passes the arm of the rock-shaft in the reverse direction to that indicated by the arrow in Fig. 10.

A record is made also of those vibrations or motions of the engine or other piece of apparatus or mechanism with which the apparatus is connected that are represented by the indicator $a$, and also of the changes in the direction of the motion, as the same take place, through the medium of the following mechanism, the construction and operation of which will be described with reference to Fig. 1. A record making arm $f$ is movable on a fixed stud or pivot 90, and its free end is movable in a short arc having the pivot 90 for a center of oscillation, and also capable of moving with a long sweep or swing from one side to the other over the surface of the record-strip, the extent of which in either direction is limited by the stops 91—92 on the stationary cross-bar 93. The marker with which the free end of the arm $f$ is provided consists of an ink-holding receptacle 94 having an elevated neck with a small outlet passage terminating in an outlet-aperture at the tip 95, the flow of the ink therefrom being controlled and regulated by atmospheric pressure admitted through an aperture in the ink-holder. The vibratory movements and a change in the position of this recording device from one side of the record-strip to the other are made to correspond with the vibratory movements and changes in the working position of the indicator $a$, thus making a record not only of the revolutions of the engine-driven shaft, but also of the changes taking place in the direction of its motion. This recording device is readily actuated and moved by the same means that operates and controls the indicator $a$; as by connecting the arm $f$ by a wire 96 with the wire 3 that runs from the bar $d$ to the lever 5 on the engine-frame. The movements of that part 5 as it is struck by the projection on the traveling cross-head will thus be transmitted to the arm $f$ as well as to the indicator $a$, and both parts will be moved in harmony with each other, and in such manner that the vibrations of the indicator will be marked on the record-strip by a zig-zag line, the number or elements of which will vary in open or close order according to the rapidity of the movements imparted to the lever 5. In like manner, also, the recording device $f$ will be moved in an arc on the center 90 from one side to the other of the record-strip as often as the indicator $a$ changes its working position, and by that movement the record as made by the recording-device will be transferred from one side to the other of the record-strip.

According to the arrangement of the mechanism shown in Fig. 1 the arm $f$ will mark the zig-zag line along the left side of the record-strip as long as the engine-driven shaft continues to be driven "forward"; but being shifted over the center to the opposite side, the arm will mark the zig-zag line on the opposite side, where it will be associated with the records of the signals as printed by the type-bars in the set on the right of the center, as often as the direction of the motion of the engine is changed to "astern", and as long as the power-driven shaft continues to travel in that direction.

The record-strip $h$ is drawn from the lower roller 100 and wound on the upper roll 101 at a uniform rate of movement under the recording-devices by a pair of feed-rollers 102—103 connected with a spring-motor of any well-known construction. The upper roller 101 is also connected with the motor by gears 105 for winding up the record strip as it is drawn from the lower roll.

The movement of the record-strip is made a continuous one, by employing a spring-barrel of the required power, and winding it at proper intervals. For that purpose the spring-barrel is connected with a winding-means operated mechanically from the same means that vibrate the indicator, so as to keep the barrel wound and in working condition as long as the indicating mechanism is in operation, without requiring attention and winding by hand. Provision is made, however, for winding the spring-barrel at the time of starting the engine after the mechanism has been standing at rest long enough for the spring-barrel to run down, by extending the end of a winding-shaft or arbor 106 through the end of the case to take a winding-key or crank. An efficient form of automatic winding mechanism for the purpose is illustrated in Figs. 7 and 8. Fixed on the winding shaft 106 is a ratchet-wheel 110 situated under and in line with a ratchet-toothed portion 112 on the reciprocatory bar $d$, the teeth of which are set in the proper direction to act on the wheel 110 in the down-stroke of the bar but to slip in the opposite direction, thus converting the reciprocating movements of the bar $d$ into rotary movement of the winding-shaft in one direction. This ratchet-toothed portion is a separate piece attached to the bar $d$ by a hinge-joint 108, so as to have a limited movement independently of the bar $d$, to engage and disengage the ratchet-wheel 110. The means for throwing off the winding-mechanism as often as the spring-barrel is wound up consists of a tilting switch-piece 113 pivotally supported beneath the stationary guide-plate of the slide $r$, and connected with the part 112 by an arm 114, the end of which extends through a slot 115 of proper length to permit the longitudinal vibratory movement of the bar $d$. The shaft 106 is also connected with a screw-shaft 109 by means of the long pinion 118 on the shaft 106 and the "switch piece" operating-wheel 119 on the screw-shaft 109. The hub of the wheel 119 is threaded to engage and work on the screw-shaft, and the latter is so geared into the rollers or parts actuated by the spring-barrel that as the spring-barrel runs down in driving the record-strip the screw-shaft 109 will cause the wheel to travel from left to right, or in a direction contrary to that in which the wheel as rotated by the long pinion 118 will travel in the winding operation.

The traveling gear-wheel is located directly under the switch-piece, and in such close relation to the edge of that piece that when the wheel arrives at the end of its travel at the left, as represented in Figs. 7 and 8, it will strike the incline on the left side of the tilting-piece and by elevating that end it will act to lift the ratchet-toothed portion of the bar $d$ and disengage the ratchet from the ratchet-wheel 110 of the winding-mechanism. By a contrary movement, or towards the right, as indicated by the dotted lines in Fig. 7, the wheel 119 on reaching the end of its travel in that direction will tilt the switch-piece in the opposite direction, with the effect to set the ratchet-bar in working engagement with the ratchet-wheel 110. The wheel 119 thus travels in one direction under the action of the long pinion, but is caused to travel in the opposite direction by the screw-shaft as the same is rotated by the running down of the spring-barrel. When the revolutions of the long pinion exceed the rotative movement of the screw-shaft it will be seen that the wheel moving on the screw-shaft towards the left will disengage the ratchet-toothed bar from its ratchet-wheel, and the winding operation will cease. The parts will remain disconnected until the screw-shaft turning in the opposite direction brings the wheel back to the starting-point at the right, whereupon the wheel will engage the inclined end of the switch-piece and set the bar $d$ into the ratchet-wheel. A flat spring 121 bearing on the top of the switch-piece holds that part in either of the positions indicated, respectively, by the full lines and the dotted lines in Fig. 7. Under some conditions of use of this recording-mechanism where signals are transmitted and the motions of the engine are changed at long intervals, rendering it unnecessary to have the record-strip travel continuously, I have provided in addition to the winding-mechanism a stop-motion that, when thrown into action, will limit the movement of the record-strip by stopping the spring-barrel when the record-strip has been given a predetermined length of travel, and holding it at rest until another signal is transmitted. An effective way of controlling the movements of the record-strip to set it in motion and to arrest its travel at a given interval after the record is made, is illustrated in Figs. 1 and 6, where a locking lever 122 acting in conjunction with a disk 123 on the axle of one of the gears in the train prevents that part from rotating, and the record-strip from moving. The hooked-end of the lever when lifted above the shoulder 124 and allowed to ride on the edge of the disk unlocks the roller and the latter will be turned by the spring-barrel until the disk 123 has completed a revolution, and the lever 122 engages the shoulder again. The locking-lever is raised to release and set the record-strip in motion at the required intervals by the means seen in Figs. 1 and 6, consisting of a rotatable striker-bar 127 carrying loosely attached weights 128 on its ends, a lever 129 fulcrumed on a fixed support 130 and having its arm or member on one side of its fulcrum situated under or in the path of the striker-bar, and its arm or member on the opposite side connected to the locking-lever. A spring 131 holds the lever 122 against the edge of the disk, and brings it back to place as often as it is set above the shoulder by the movement of the lever 129. When it is desired to have the record-strip travel continuously the disk 123 is loosened on its shaft, so as to remain stationary while the rollers being no longer controlled by it, will rotate continuously.

That feature in the present invention which provides for a warning signal whenever a change made in the movements of the engine in response to a signal does not correspond to the order transmitted to the engine-room, has for its object to notify the engineer of any error on his part in understanding and obeying the signals, and also to give timely information to the pilot of any mistake on the part of the engineer.

Figs. 1, 12 & 13 represent a means for operating a warning signal by closing an electrical circuit in which is included a battery 133 to supply current, and an electrically-operated signal, such as an electric bell 134, to give an audible signal: or an electric lamp, when a visual signal may be preferred to a bell. This device is associated with and actuated in one way from the vibrating indicator a as shown in Figs. 1, 12 and 13, or, in another way, from the movements of the recording-device f as illustrated in Figs. 14, 15, 16.

In Fig. 12 one pole of the battery 133 is represented as so connected by a wire 135 to the guides 2 that the bar d and the sleeve 10 will be included in the circuit and form conducting elements thereof. To the opposite pole are connected by conductors 136 two sets of circuit-closing contact-arms 137—138, situated on opposite sides of and in line with the ends of the sleeve 10, that carries the indicator a. Each circuit-closer is composed primarily of an arm movable in a limited arc on a pivot 139, and held by a spring 140 in a horizontal position over and in line with a movable block 141 (or 142) having an inclined face, but capable of yielding and being turned up as it is struck by the inclined face of the operating block. The inclined faces of the two blocks are brought against the arms when the blocks are drawn towards them, and one or the other of the arms 137—138 is moved and held as the blocks 141, 142 are moved. The two blocks are connected with the wires of the telegraph by a wire 144 attached to the lower end of the block 141, and a wire 145 carried from the block 142 in the same direction to the outside. These wires 144—145 are connected to the wires 55—57 in the signaling-mechanism, as seen in Fig. 1, and the two blocks are connected together by a wire 148 attached to the upper end of each block and laid over a pulley 150. The effect of this arrangement is to draw one block upward or away from the contact-arm lying over it, and at the same time draw the other block downward, or into such position under the other contact-arm that the inclined face of the block will elevate the free end of the arm and hold it out of the path of a standing or contact-pin; one 151 being fixed at the lower end, and the other 152 at the upper end of the sleeve 10. As the blocks 141—142 are connected with the telegraph, it will be seen that the block 141 will raise and hold the arm 138 out of the path of the pin 152 on the sleeve 10 when the telegraph pointer is set over to the right, and the block 142 will similarly act on the arm 137 of the other circuit-closer when the pointer is set over to the left. Under these conditions it will be obvious that as long as the change made in the direction of the motion of the engine sets the sleeve 10 in proper working position on one side or the other of the center X in response to the signal given, the adjustment of the sleeve 10 always corresponds to the character of the signal, and it will occupy a position on the "ahead" side of the sight-opening when the pointer v is set to indicate a "forward" signal, and on the "astern" side when the signal transmitted is of the contrary character; and as the blocks 141—142 always follow the movements of the pointer, and are set in position accordingly, to throw one or the other of the circuit-closing arms out of action, there will be no contact between the arm and the adjacent contact-pin on the sleeve 10 during the time the arm is raised and held up. But should the sleeve 10 be changed as to its working position and be brought in close relation to the circuit-closing arm that has not been properly set out of operative position by its inclined-face block being moved in the right direction, a circuit will be completed through the signal-actuating means at the instant that the contact-pin on the sleeve 10 is brought against the contact-arm of the circuit-closer. The indicator a must always occupy a working position on that side of the center X where the contact-arm of the circuit-closer is held up by the inclined-face block, and as those blocks which control the contract-arms, before mentioned, are set in and out of operative position from the telegraph they bring one or the other of the circuit-closers into action, according to the character of the particular signal transmitted; the circuit-closer 137 being set out of position when a forward signal is given, and the circuit-closer on the opposite side of the sleeve 10 when the signal is of a contrary character.

Instead of being operated from the motion-indicating means, as above described, the warning-signal can be combined with the recording-mechanism by using the vibrating recording-arm $f$ to operate the circuit-closer, or as a part of such means; and I have illustrated in Figs. 14, 15 and 16, a construction of circuit-closing means controlled by the recording-arm $f$ which will be found well adapted for the purpose. In this modification the circuit-closers 154—155 are pivotally attached at 156 to a bridge or fixed support 157 under which the recording-arm $f$ is situated, and movable on their pivots from a horizontal position clear of the arm $f$, to an angular position in the path of the arm. Both circuit-closers 154—155 are connected in circuit with one pole of a battery 200 through a conducting wire 201 and the bridge 157, and the arm $f$ is connected into the opposite pole through a conducting-wire 202; thus using that part as a means to complete a circuit through the battery and the alarm bell 204 by coming in contact with one or the other of the arms 154—155. The moment of contact and closing of the circuit is determined by turning into an inclined position in the path of the arm $f$ that one of the circuit-closers 154—155 that lies directly over the working position of the arm $f$, and the latter in its vibration will strike the plate and close the circuit at the moment that the plate is turned down. The two plates 154, 155 are necessarily arranged in this manner over opposite sides of the arm $f$, for the reason that the latter will occupy one working position when recording the forward revolutions of the engine-driven shaft, and a different working-position on the opposite side of the center when it is recording the backward motion of the shaft, and one or the other of the circuit-closers 154—155 is set in the path of the arm $f$ according to the particular position occupied by the arm at the time. The circuit-closers 154—155 are controlled as to position through the adjustment or movements of the signaling-mechanism, so that the circuit-closing plate lying over the arm $f$ when that part is in normal working position will be turned up out of the way, but the opposite circuit-closing plate will be turned down. Thus, for illustration, when a signal to change the motion from "astern" to "ahead" is transmitted, the hinged plate 155 will be turned down in the path of the arm $f$; but as the normal working-position of that arm under those conditions is on the left of the center and not on the right, no circuit will be formed, and the alarm-bell will not sound. Should the engineer, however, fail to understand the signal and adjust the engine to give the shaft a different direction of motion from that called for by the signal, the arm $f$ which follows the indicator $a$ in its movements will be shifted over to the right; or it will be working out of its normal position, and it will come in contact with the plate 155 which is holding an inclined position at the time, with the result to close the bell-circuit and sound an alarm. The hinged plates 154—155 are set into and out of such inclined position by the means acted on by the mechanism that records the signals and comprising the following parts, the arrangement and operation of which will be more readily understood by referring to Figs. 14, 15 and 16:—Behind or under the hinged plates 154—155 is a stiff bar 205 attached at one end to a rigid support 206, and carrying on its free end a cross-piece 207, on the ends of which are two standing-pins 208, 209, one situated under the longer member of the hinged plate 154, and the other under the corresponding longer member of the other plate 155. The bar 205 being situated directly over and in close relation to the type-carrying head of the middle type-bar $q$, its outer end will be thrown upward or towards the members of the hinged plates that lie over the standing pins 208—209, and the latter thereby will strike against and raise that one of the hinged-plates which may have been occupying an inclined position. As the middle type-bar $q$ is operated both when a "stop" signal and a "start" signal is transmitted, as already described, it will be seen that the plates 154—155 will be set out of the path of the motion-recording arm $f$ before either an "ahead" signal or an "astern" signal is given, thereby bringing the plates in position ready to be turned down over the arm $f$ on the one side or the other, according to the character of the signal next transmitted. The means for turning down the plate 154 consists of an arm 210, fixed at one end on the stationary-bar 206 and carrying on its free end two standing-pins 212, 213, one of which is situated directly under the longer arm or member of the hinged plate 155, but the other under the shorter member of the opposite plate 154. The arm 210 also lies over and in close relation to the first type-bar $p$ in the series on the right of the middle type-bar $q$, and is thrown upward or outward by the up-stroke of the type-bar.

As often as an "ahead" signal is transmitted by the telegraph it is recorded on the record-strip, and at the same time the arm 214 is thrown by the type-bar against the hinged-plates 154 or 155, with the effect to raise the plate 154, if it should be occupying an inclined position, and simultaneously turn down the opposite plate 155. An arm 210 of the same form and correspondingly arranged over the first type-bar in the series on the right, operates in a similar manner to turn down the plate 154 and raise the plate 155 at the moment that an "astern" signal is sent over the telegraph, and the contact 155 is properly set to clear the arm f while that part is vibrating in the proper working-position on the right; but the other 154 to stand in the path of the arm, if it should be improperly shifted or caused to occupy a position on the left of the center. The ends of the shorter arms or members of the two plates 154—155 being in contact with a spring 217 supported from the bridge are supported in either the elevated or the inclined position. With the arm f in proper working-position on the left; as indicated in Fig. 14, the contact-plate 154 will stand clear of the arm, as indicated by the full lines on the left, but the opposite plate 155 will be inclined as shown by the full lines on the right of the center. This position of the circuit-closers 154—155 calls for the arm f to occupy a working-position on the left where it may vibrate without making contact with the circuit-closers 154—155; and when the arm f is properly set in response to a "forward" signal transmitted to the engine-room it will vibrate without making contact with the circuit-closers 154, or 155, and no alarm will be sounded. On the other hand, should the engineer misunderstand the signal and reverse the engine the motion-recording arm f will be set over to the right, where it will immediately make contact with the inclined circuit-closer 155 and thus close the alarm-circuit. The same action takes place when the engine is caused to travel forward in response to an "astern" signal, excepting that the relative positions of the circuit-closers 154—155 will be reversed, and they will be set in the position, indicated by the dotted lines.

An important feature in maintaining the efficient working-condition of the indicating and the recording-mechanism consists in a circuit-controlling device interposed or placed in the connecting wire through which the movement of one part is transmitted to another part or member, and so arranged that it operates to close an electric-circuit upon a bell when the wire breaks. This device is of advantage particularly in those situations where a wire of considerable length is used, or where a wire is of necessity concealed from view, or is not under frequent inspection. It consists of two circuit-closing contacts held normally apart by the tension that is maintained on the wire while it is in working condition, but acting to close an electrical circuit at the instant that the wire breaks or its tension is reduced below the working point. The contacts last mentioned are the terminals of an electrical circuit in which is included a source of current and an electric-bell 184, or an incandescent light.

In the construction illustrated in Fig. 17 one contact 180 fixed in the end of a tube 181 and insulated from it, is connected by a wire 182 with one pole of a battery 183; another wire 182$^a$ connecting the tube to the opposite pole of the battery brings in the tube, and also a plunger 185 inclosed by the tube as elements or members of the circuit. A device of this kind is interposed in the wire 3 that connects the bar d with the vibrating-means on the engine, as seen at 181, Figs. 1 and 12. This device is also placed in the wires that connect the type-bar actuating means in the recording-mechanism with or into the wires 55—57 of the telegraph, as seen at 181$^a$, 181$^b$, in Fig. 1. A coiled-spring 190 interposed between the plunger and the end of the tube and kept in a state of compression by the tension on the wire brings the plunger against the contact 180 whenever the wire breaks; or, when through the derangement of connected parts the wire becomes slack, or the tension is reduced below the proper degree to keep the mechanism in working condition, and the spring 190 is allowed to act. This device is applied to advantage whenever a wire transmitting the motion of one part of the mechanism to another is maintained under a condition of tension sufficient to hold back the plunger against the reactive force of the spring behind the plunger. It is of advantage, also, in maintaining a wire under normal or proper working tension.

In Figs. 5 and 18 is shown a means for dating the record-strip from day to day when it is desired to separate the records of one day from another. This is accomplished by mounting over the record-strip a set of printing-wheels 170, 171, 172, similar to the ordinary dating-stamp, on a common axle 173 in a movable frame 174, and connecting with the frame a plunger or handle 175, the head of which is situated outside the case. The frame 174 is pivotally attached to a fixed support 176 and is held in position with the wheels normally out of contact with the record-strip by a spring 177. The rims of the wheels project through an opening in the front of the case for turning them to change the date. An impression is made on the record-strip by pressing in and then releasing the plunger, and the wheels are conveniently changed and set for a new date by rotating them from the outside of the case.

I have herein described and illustrated a motion-indicating and recording-apparatus embodying my said improvements in connection with an engine-driven shaft, and as combined with means for operating and adjusting its mechanism from a reciprocating steam-engine. But it will be obvious that the improvements are capable of being applied to a shaft that is revolved by a motor of any kind, so as to indicate the direction in which the shaft may be revolved, and to record as well its change of motion and its relative rate of speed. I do not desire to be understood, therefore, as restricting or limiting the scope of my invention to its combination with a reciprocating engine, or to a shaft driven by an engine of that class or description.

The recording device, consisting of the marking arm $f$, or its equivalent, is arranged to be shifted in consonance with the movements of the parts of the engine that control the direction of motion of the shaft, being shifted to record on one side of the record strip when the parts of the engine are set to turn the shaft forward, and to the other side of the record strip when the parts are set to reverse the shaft. Besides these relatively long shift movements of the recording arm, which indicate positions of the parts to give motion in one direction or the other, the recording device is arranged to make a record indicative of the speed of the engine or of the fact that it is at rest. By reference to Fig. 1 there will be seen upon the part of the record sheet or strip that is about to be wound on the roller 101, a curved line, made by shifting the marker from one side of the strip to the other and indicating a movement of the parts of the engine to change the direction of movement of the shaft. Observing the record made along the left of the sheet, it will be seen that after the shift, indicating a setting of the parts to give a particular direction, there was a short space of time during which the engine was at rest, indicated by the straight line parallel with the edge of the strip. Then the engine began to move slowly, as indicated by the open zigzag line made by the vibrations of the marker $f$, after which the speed of the engine was increased as indicated by the zigzag line adjacent to the mark 2, and after running at this speed for a short time, a faster and perhaps full speed was attained as indicated by the close zigzag markings extending downward to the marker on the arm $f$.

What I claim is:—

1. In a motion-indicator and recorder for an engine-driven shaft the combination, of a motion-indicating hand; means vibrating the hand in harmony with the revolutions of the shaft; a movable record-strip; a recording-device in contact with the record-strip; means for vibrating said recording-device in harmony with the vibrations of the said hand; means for changing the working position of the motion-indicating hand in every change taking place in the direction of the revolutions of the shaft; and means operating at the moment of every change in the direction of the motion to similarly change the position of the recording-device upon the record-strip.

2. In a motion-indicator and recorder for a revolving shaft the combination, of a motion-indicating hand; means for vibrating the hand in harmony with the revolutions of the shaft; means operating to give the said hand a given position without affecting its vibrations when the shaft is revolving in one direction, and another position when revolving in a contrary direction; a movable record-strip; and a single recording-device actuated from the hand-vibrating means and operating to make a record on the record-strip of the vibrations of the said hand and to change the relative position of its record simultaneously with the change in the position of the motion-indicating hand.

3. In a motion-indicator and recorder for a revolving shaft the combination, of a motion-indicating hand; means for vibrating the hand in harmony with the revolutions of the shaft; means controlled by said hand-vibrating means operating to give the said hand one working position during the revolutions of the shaft in one direction, and another position when its revolutions are in the contrary direction; a movable record-strip; means for recording thereon the vibrations of the motion-indicating hand; means operating in every change taking place in the working position of the motion-indicating hand to change the relative position on the record-strip of the record made by the recording-device.

4. In a device for indicating and recording the motions of an engine-driven shaft the combination, of a motion-indicating hand; means for imparting longitudinal vibratory motion to the hand from, and in harmony with, the revolutions of the engine; means operating to change the relative position of the motion-indicating hand when the engine is reversed; a movable record-strip; means for giving progressive movement to the record-strip; an oscillating recording-device; means for actuating said recording-device in harmony with the vibrations of the motion-indicating hand; and means connecting said recording-device with the hand and operating to change the relative working-position of the said recording-device from one part to another part of the record-bearing surface of the said strip, as often as the direction of the motion being recorded is reversed.

5. The combination, with a revoluble shaft and means for driving the same and for changing its direction of motion; of a motion-indicating device having vibratory motion in harmony with the shaft; means for varying the working-position of the said device to indicate thereby the direction in which the shaft is being driven; a recording-device operating to make a record of such variations in working-position, and also of its vibrations; a signal-transmitting means operating sets of signals for controlling the direction and varying the character of the motion of the shaft both "ahead" and "astern"; recording-devices adapted to make separate records of both sets or characters of signals as transmitted; an alarm signal; and means for operating said signal, including two co-acting members, one of which is adjusted as to its operative position from the signal-transmitting means, and means controlling the operative position of the other co-acting member from the shaft-driving means.

6. In a motion-indicator and recorder the combination, with an engine-driven shaft having revolving motion variable in character and in direction from adjustments of the engine; of a signal-transmitting device adapted to transmit one set of signals for controlling the motion of the shaft in one direction, and another set of signals for controlling its motion in the contrary direction; a movable record-strip; a set of independent record-making parts for making a separate record of each set of signals in the order of their transmission; means for making a continuous record on the record-strip of the motion of the shaft; and means operating to change the character of the record coincidently with the change in the character or in the direction of the motion of the shaft.

7. In a motion-indicator and recorder for an engine-driven shaft, the combination of the movable record-strip; resilient type-bars, individual rock-shafts therefor, means actuated by each rock-shaft for alternately deflecting and releasing its associated type-bar; a slide-plate; stops on the slide-plate adapted to engage and selectively move the rock-shafts according to the length of the movement imparted to the slide-plate; a signal-transmitting device adapted to transmit different signals by a variable length of movement of the transmitting means; and means operating the said slide-plate to move the same coincidently with the movement of said transmitting means.

8. The combination, with the resilient type-bar fixed at one end and carrying on the free end a type-head; of the rock-shaft having radially projecting arms, the links loosely connecting the type-bar to the arms on opposite sides of the axis of the rock-shaft, and a reciprocative slide-plate having a stop adapted to engage and rotatively move the rock-shaft, as a means of alternately deflecting and releasing the type-bar.

9. In a motion-indicator and recorder for an engine-driven shaft, a motion-indicating device; means for vibrating the said device in harmony with the motions of the engine-driven shaft; a movable record-strip; means for making a record on the record-strip of the vibrations of the indicating-device; feeding-rolls for advancing the paper under the recording means; a spring-barrel geared into the said rolls; and mechanism adapted to wind the spring-barrel from the movements of the indicator-vibrating means, including the reciprocating ratchet-tooth bar; ratchet-wheel connected with the winding-arbor; the screw-shaft; the traveling pinion on said shaft; the long pinion actuated from the spring-barrel; means actuating the screw-shaft from the record-strip; feeding-rolls; the tilting switch-piece, engaging the traveling pinion; and means connecting the ratchet-toothed bar with the switch-piece.

10. The combination, with the record-strip feeding-rolls; of a stop-motion comprising a stop-wheel geared into the arbor of one roll; a spring-held locking lever, a rotatable fly-shaft, arms thereon, a lever pivotally mounted in the path of the arms, and a rod connecting the lever with the locking-lever.

11. In an organized mechanism for indicating and recording the movements of an engine-driven shaft the combination, of a signal-transmitting means for controlling the motion of the engine; means operated from the movements of the said signal-transmitting means for making a record of the signals, said means including a connecting-wire; means for maintaining said wire under tension; and an alarm-signal device interposed in said wire and containing two co-acting members which are normally held out of action by the tension of the wire, and a spring adapted to bring said co-acting members in engagement and thereby operate the alarm-signal when the wire breaks or slackens so as to become ineffective.

12. In a motion-indicator for an engine-driven shaft, the combination, of a reciprocative bar; a spring attached thereto; means for moving the bar in opposition to said spring and in harmony with the revolutions of the engine, comprising a finger on the cross-head of the engine, a lever pivotally mounted on the engine-frame in position to engage and be struck by the said finger in the reciprocations of the cross-head; means connecting said lever with the reciprocative bar for transmitting the vibrations of the lever to said bar; an adjustable sleeve carried by the bar; a motion-indicating hand on the sleeve; a recording-device; means operatively connecting said recording-device with the sleeve; means operatively connecting said bar with a moving part of the engine and actuated from the reversing-mechanism, said means operating to change the working-position of the bar in every reversal of the engine without affecting the reciprocating movements of the bar.

13. The combination of a motion-indicating device; means for vibrating said device in harmony with the revolutions of the shaft; means for varying the position of said device according to the direction in which the shaft is being revolved; means for transmitting sets of signals for controlling the direction and varying the character of the motion of the shaft; means for recording the signals, and means for operating a signal from the motion of the revoluble shaft when the direction of the motion of the shaft does not conform to the character of the signal transmitted and recorded comprising an electrically-actuated signal in circuit with a source of current and with circuit-closing devices; and means operating to set one of said circuit-closing devices in operative position from the movements of the signal-transmitting means, and the other of said circuit-closing devices from the movement of the motion-indicating devices under a change in its working-position.

14. The combination of a revoluble shaft, means for driving the same and for changing the direction of its revolutions; an alarm-signal; and means for operating said signal, including two co-acting members one of which is adjusted as to its operative position with respect to the other from the movement of the signal-transmitting means, and means for setting the other co-acting member in one position from the motion of the shaft in one direction, and in another position when the motion is in the contrary direction; a recording device; means for operating the recording-device from the movements of the revoluble-shaft, and means for controlling the alarm-signal, whereby the same is operated when the recording-device fails to operate in harmony with the signal-transmitting means.

15. In a motion-indicating and recording-device, the combination with a line of wire maintained under tension and adapted to connect the reciprocating-mechanism with the part to be reciprocated; of means for giving an alarm-signal when the tension of the wire is reduced below the working degree, comprising a tube, a plunger movable therein; an electrical contact in the tube insulated therefrom, a spring operating to bring the plunger against the said contact, a battery having one pole connected into the tube, and the opposite pole into the said contact; the said tube and the plunger forming a coupling between two portions of the line of wire.

16. In a motion recorder for an engine, the combination of a record strip, a recording device for making a record on the strip arranged to be shifted from side to side of the strip and also to be vibrated when in position at one side or the other of the strip, and connections between the said recording device and a movable part of the engine, arranged to shift the recording device to indicate that the parts are set to turn the shaft in one direction or the other, and arranged also to cause the indicating device to be vibrated after it has been shifted to indicate the speed of the engine, substantially as set forth.

17. A motion recorder for an engine comprising a record strip, means for giving a longitudinal movement to the said strip, a recording device for marking the strip, the strip and recording device being transversely movable relative to each other, and means connected with and receiving motion from the engine arranged to shift the relative positions of the strip and recorder to mark along one side or the other of the strip accordingly as the engine is set to drive forward or backward, and arranged also to transversely vibrate the said parts with reference to each other to show the speed of the engine, substantially as set forth.

18. In a motion recorder for a driven shaft of a piece of mechanism, the combination of a record strip, means for moving it longitudinally, a recording device for making a record thereon arranged to be shifted from one side of the strip to the other and also to be vibrated when in position at one side or the other, and connections between the recording device and the said mechanism arranged to shift the recording device to one position when the parts are set to cause revolutions of the shaft in one direction and to another position when set to give revolutions in the opposite direction, and arranged also to vibrate the recording device in consonance with the speed of rotation of the shaft when in either position, substantially as set forth.

19. In a motion indicator and recorder for an engine, the combination of an indicator, a record strip, means for moving the strip longitudinally, a recording device for marking the strip, the strip and recording device being transversely movable relatively to each other, and means connected with and receiving motion from the engine, and arranged to simultaneously and synchronously shift the indicator, and the relative positions of the strip and recorder, accordingly as the engine is set to turn forward or backward, and arranged also to vibrate the indicator, and the strip and recorder with reference to each other, to show the speed of the engine, substantially as set forth.

20. In an apparatus for making upon a movable strip a record of the working of an engine, the combination of means for moving the strip longitudinally, means for making on the strip a record of the working of the engine connected with and receiving motion from a moving part of the latter, and means for winding up or storing power for operating the strip-moving mechanism connected with the means that operate the recording devices, substantially as set forth.

21. In a device for making a record of the movements of a piece of mechanism upon a movable strip, the combination of means for moving the strip, recording devices operating thereon, a power-storing device for operating the strip-moving means, a movable part receiving motion from the said mechanism, connections between the said power storing device and the said movable part, and means for controlling the said connections, substantially as set forth.

22. In a device for making a record upon a movable strip, the combination of means for moving the strip, recording devices operating thereon, connections between the record-marking devices and the part whose motions are recorded, a power-storing device for operating the strip-moving means, connections between the said power-storing device and the connections through which the recording devices are operated, and means for breaking the last said connections when the said device is wound up and for restoring the connections as it runs down, substantially as set forth.

23. In a device for making a record of signals given an engineer and of the movements of the engine in response thereto, the combination of a movable strip, a train of mechanism for moving the strip, winding-up devices for said train of mechanism operated by connections with the engine, means for making on the strip a record of the signals or orders given the engineer, connections leading from a distant point controlling the means for operating the recording devices for signals given, and a stop device operated by the last said connections for limiting the distance which the strip will be moved, substantially as set forth.

24. In an apparatus for making a record of signals transmitted from a distant point, the combination of a series of independent record-making parts, means for operating the said record-making parts in sequence as the means are moved in one direction and for again operating them in reverse order as they are moved in the other direction, whereby the first set of orders or signals are countermanded, and connections for moving the last said means, substantially as set forth.

WALTER S. RUSH.

Witnesses:
   EDWARD E. OSBORN,
   L. M. FRANK.